(12) United States Patent
Sun

(10) Patent No.: US 12,138,536 B2
(45) Date of Patent: Nov. 12, 2024

(54) METHOD AND APPARATUS FOR CONFIGURING VIRTUAL SCENE, AND STORAGE MEDIUM THEREOF

(71) Applicant: TENCENT TECHNOLOGY (SHENZHEN) COMPANY LIMITED, Guangdong (CN)

(72) Inventor: Dajia Sun, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/410,415

(22) Filed: Jan. 11, 2024

(65) Prior Publication Data

US 2024/0189712 A1  Jun. 13, 2024

Related U.S. Application Data

(63) Continuation of application No. 17/993,262, filed on Nov. 23, 2022, now Pat. No. 11,918,901, which is a
(Continued)

(30) Foreign Application Priority Data

Sep. 13, 2018 (CN) .......................... 201811070484.1

(51) Int. Cl.
*A63F 13/52* (2014.01)
*A63F 13/537* (2014.01)
(52) U.S. Cl.
CPC ............ *A63F 13/52* (2014.09); *A63F 13/537* (2014.09)
(58) Field of Classification Search
CPC ................................ A63F 13/537; A63F 13/52
See application file for complete search history.

(56) References Cited

U.S. PATENT DOCUMENTS 4,389,048 A * 6/1983 Burgess ..................... A63F 7/26
273/121 A
7,670,225 B2 * 3/2010 Nishimura .............. A63F 13/45
463/33
(Continued)

FOREIGN PATENT DOCUMENTS

CN         1945588 A      4/2007
CN       104333783 A      2/2015
(Continued)

OTHER PUBLICATIONS

International Search Report issued on Nov. 21, 2019 in International Application No. PCT/CN2019/102136, English translation.
(Continued)

*Primary Examiner* — Steve Rowland
(74) *Attorney, Agent, or Firm* — Crowell & Moring LLP

(57) ABSTRACT

A method and apparatus for configuring a virtual scene are provided. The method includes transmit a plurality of pieces of first-type configuration information for a candidate scene element in the virtual scene to a first-type first client; transmit a plurality of pieces of second-type configuration information for the candidate scene element in the virtual scene to a second-type first client, the first-type configuration information and the second-type configuration information being configured respectively for different attributes of the candidate scene element in the virtual scene; obtain a target configuration information for a target scene element in the virtual scene based on instructions by the first-type first client and the second-type first client indicating the different attributes of the candidate scene element; and instruct a second client to display the target scene element in the virtual scene based on the target configuration information.

20 Claims, 7 Drawing Sheets

Related U.S. Application Data continuation of application No. 17/104,646, filed on Nov. 25, 2020, now Pat. No. 11,541,310, which is a continuation of application No. PCT/CN2019/102136, filed on Aug. 23, 2019.

(56) References Cited

U.S. PATENT DOCUMENTS

| | | | |
|---|---|---|---|
| 2003/0125107 A1* | 7/2003 | Cannon | G07F 17/3244 463/25 |
| 2003/0157985 A1 | 8/2003 | Shteyn | |
| 2007/0066403 A1* | 3/2007 | Conkwright | A63F 13/803 463/43 |
| 2008/0102916 A1* | 5/2008 | Kovacs | G07F 17/3211 463/16 |
| 2009/0137298 A1* | 5/2009 | Bedingfield, Sr. | G06Q 30/02 463/9 |
| 2010/0279762 A1* | 11/2010 | Sohn | A63F 13/58 463/23 |
| 2010/0304839 A1* | 12/2010 | Johnson | A63F 13/67 463/43 |
| 2012/0302328 A1* | 11/2012 | Walker | G07F 17/3244 463/25 |
| 2013/0225268 A1* | 8/2013 | Caputo | G07F 17/3237 463/25 |
| 2014/0236331 A1 | 8/2014 | Lehmann et al. | |
| 2015/0231502 A1* | 8/2015 | Allen | A63F 13/47 463/42 |
| 2015/0375120 A1* | 12/2015 | Lim | A63F 13/798 463/23 |
| 2016/0001183 A1* | 1/2016 | Harvey | A63F 13/67 463/2 |
| 2016/0067611 A1* | 3/2016 | Ware | A63F 13/79 463/29 |
| 2016/0175715 A1 | 6/2016 | Ye et al. | |
| 2017/0003740 A1* | 1/2017 | Verfaillie | A63F 13/87 |
| 2017/0003784 A1* | 1/2017 | Garg | A63F 13/87 |
| 2018/0243656 A1* | 8/2018 | Aghdaie | A63F 13/67 |
| 2021/0086083 A1* | 3/2021 | Aghdaie | A63F 13/67 |
| 2023/0206268 A1* | 6/2023 | Huston | G06Q 30/0207 345/633 |

FOREIGN PATENT DOCUMENTS

| | | |
|---|---|---|
| CN | 105844694 A | 8/2016 |
| CN | 106937158 A | 7/2017 |
| CN | 107526591 A | 12/2017 |
| CN | 107885473 A | 4/2018 |
| CN | 108184144 A | 6/2018 |
| CN | 108211358 A | 6/2018 |
| CN | 108310765 A | 7/2018 |
| CN | 108434737 A | 8/2018 |
| CN | 109395385 A | 3/2019 |

OTHER PUBLICATIONS

Office Action issued on Chinese Application 2018110704841 on Feb. 1, 2021, 10 pages.

\* cited by examiner

| | | Select a weather change of this round: | | |
|---|---|---|---|---|
| ○ Sunny | ○ Heavy fog | ○ Typhoon | ○ Scorching sun | ○ Gloomy |
| Gloomy | Damp | Drizzle | Thunder shower | Sunny |
| Drizzle | Drizzle | Scorching sun | Haze | Sunny |
| Thunderstorm | Gloomy | Scorching sun | Heavy fog | Windy |
| Typhoon | Gloomy | Damp | Gloomy | Cloudy |
| Heavy fog | Windy | Drizzle | Gloomy | Haze |

FIG. 7

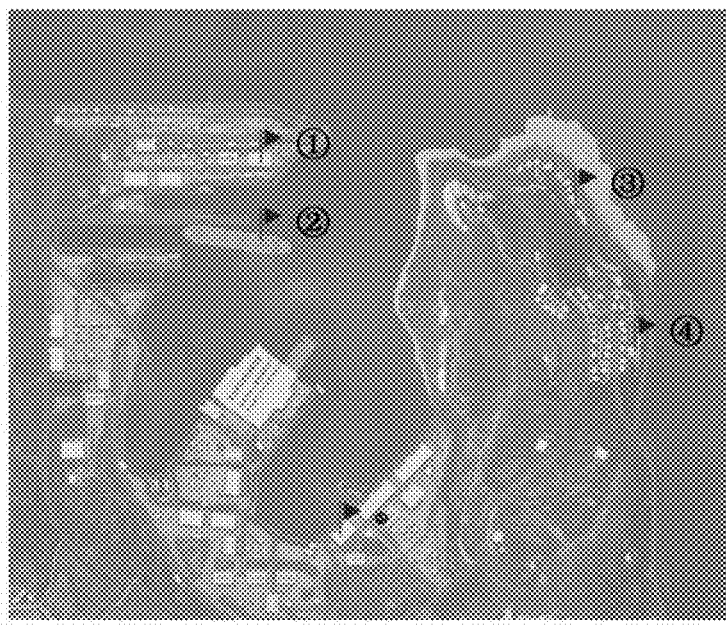

Select a refresh location of this supply:
○ Location 1
○ Location 2
○ Location 3
○ Location 4
○ Location 5

FIG. 8A

Select a refresh category of this supply:
○ Remington R700
○ Mosin-Nagant
○ G28
○ Level 3 Helmet
○ Level-3 bulletproof vest

FIG. 8B

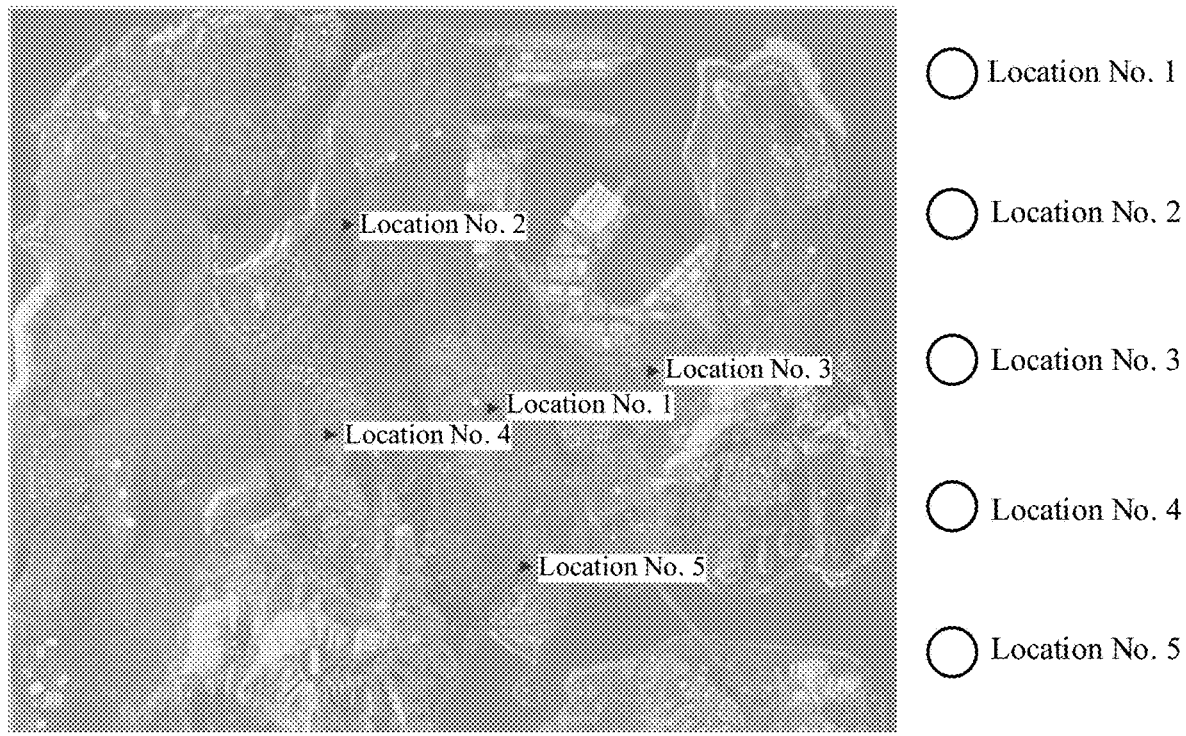
FIG. 9
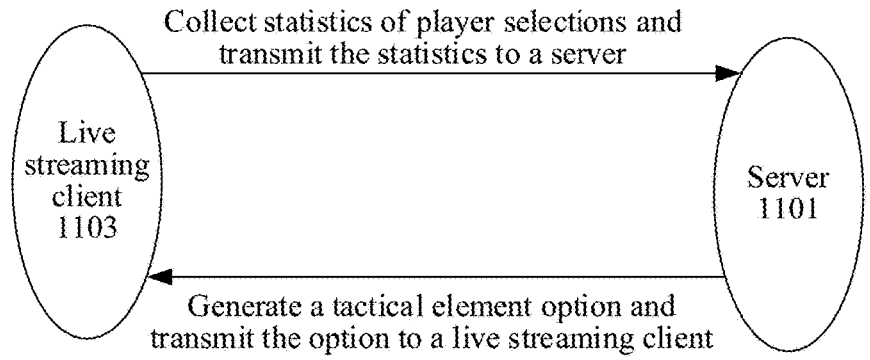
FIG. 10
FIG. 11

METHOD AND APPARATUS FOR CONFIGURING VIRTUAL SCENE, AND STORAGE MEDIUM THEREOF

RELATED APPLICATION

This application is a continuation application of U.S. application Ser. No. 17/993,262, filed on Nov. 23, 2022, which is a continuation application of U.S. application Ser. No. 17/104,646, filed on Nov. 25, 2020, which is a continuation application of PCT Patent Application No. PCT/CN2019/102136, filed on Aug. 23, 2019, which claims priority to Chinese Patent Application No. 201811070484.1, entitled "CONFIGURATION METHOD AND APPARATUS FOR VIRTUAL SCENE, STORAGE MEDIUM, AND ELECTRONIC DEVICE" filed with the National Intellectual Property Administration, PRC on Sep. 13, 2018, wherein the content of each of the above-referenced applications is incorporated herein by reference in its entirety.

FIELD OF THE TECHNOLOGY

This application relates to the field of the Internet, and specifically, to a method and an apparatus for configuring a virtual scene.

BACKGROUND OF THE DISCLOSURE

With the development of multimedia technologies and the popularity of wireless networks, entertainment activities of people become increasingly rich, for example, playing a game online by using a portable media device and playing a single or online game by using a computer. There are various types of games such as barrage shooting games, adventure games, simulation games, role-playing games, casual chess and card games, and other games.

During gaming in most types of games, for example, in a 3D-type game, a game progress or game logic may need to be changed in a game process, and currently, this can only be achieved by a player by specifying settings in a setting menu before a game starts. Such a setting manner leads to an undiversified operation mode and degrades user experience.

For the foregoing problem, no effective solution has been provided yet.

SUMMARY

Embodiments of this disclosure provide a configuration method and apparatus for a virtual scene, a storage medium, and an electronic device, to resolve at least a technical problem of a relatively undiversified setting manner in the related art.

According to an aspect of the embodiments of this disclosure, a method for configuring a virtual scene is provided. The method may include transmitting a plurality of pieces of first-type configuration information for a candidate scene element in the virtual scene to a first-type first client. The method may further include transmitting a plurality of pieces of second-type configuration information for the candidate scene element in the virtual scene to a second-type first client, the first-type configuration information and the second-type configuration information being configured respectively for different attributes of the candidate scene element in the virtual scene. The method may further include obtaining a target configuration information for a target scene element in the virtual scene based on instructions by the first-type first client and the second-type first client indicating the different attributes of the candidate scene element. The method may further include instructing a second client to display the target scene element in the virtual scene based on the target configuration information. A player activity in the virtual scene is only viewable via the first-type first client and the second-type first client and the player activity in the virtual scene is interactable via the second client.

According to another aspect of the embodiments of this disclosure, an apparatus for configuring a virtual scene is further provided. The apparatus may include a memory operable to store program code and a processor operable to read the program code. The processor may be configured to transmit a plurality of pieces of first-type configuration information for a candidate scene element in the virtual scene to a first-type first client. The processor may be further configured to transmit a plurality of pieces of second-type configuration information for the candidate scene element in the virtual scene to a second-type first client, the first-type configuration information and the second-type configuration information being configured respectively for different attributes of the candidate scene element in the virtual scene. The processor may be further configured to obtain a target configuration information for a target scene element in the virtual scene based on instructions by the first-type first client and the second-type first client indicating the different attributes of the candidate scene element. The processor may be further configured to instruct a second client to display the target scene element in the virtual scene based on the target configuration information. A player activity in the virtual scene is only viewable via the first-type first client and the second-type first client and the player activity in the virtual scene is interactable via the second client.

According to another aspect of the embodiments of this disclosure, a non-transitory machine-readable storage medium is further provided. The storage medium may have processor executable instructions stored thereon. The instructions may cause a processor to transmit a plurality of pieces of first-type configuration information for a candidate scene element in the virtual scene to a first-type first client. The instructions may further cause the processor to transmit a plurality of pieces of second-type configuration information for the candidate scene element in the virtual scene to a second-type first client, the first-type configuration information and the second-type configuration information being configured respectively for different attributes of the candidate scene element in the virtual scene. The instructions may further cause the processor to obtain a target configuration information for a target scene element in the virtual scene based on instructions by the first-type first client and the second-type first client indicating the different attributes of the candidate scene element. The instructions may further cause the processor to instruct a second client to display the target scene element in the virtual scene based on the target configuration information. A player activity in the virtual scene is only viewable via the first-type first client and the second-type first client and the player activity in the virtual scene is interactable via the second client.

In the embodiments of this disclosure, the first terminal displays the plurality of pieces of configuration information obtained from the server, the configuration information being used for configuring the scene elements in the virtual scene, for example, tactical elements, such as a flight route and supplies richness, in a game. The user may trigger the selection operation for the scene element. The first terminal detects the foregoing selection operation, generates the selection instruction carrying the selected configuration information, and transmits the selection instruction to the server. The server generates the indication information based on the foregoing selection instruction to indicate the target scene element in a plurality of scenarios, and then transmits the indication information to the application running on the second terminal, for instructing the application running on the second terminal to display the target scene element in the virtual scene. In the operation process of the application, a manner of specifying settings in advance before operation of a game is replaced with allowing users to participate in determining final configuration information, so that flexibility of configuration is improved, and enthusiasm and a sense of participation of a user are improved, and this is conducive to promotion of the disclosure.

BRIEF DESCRIPTION OF THE DRAWINGS

The accompanying drawings described herein are used to provide further understanding of this disclosure, and form a part of this disclosure. Exemplary embodiments of this disclosure and descriptions thereof are used to explain this disclosure, and do not constitute any inappropriate limitation to this disclosure. In the accompanying drawings:

FIG. 7 is a schematic diagram of an optional user interface according to an embodiment of this disclosure.

FIG. 8A is a schematic diagram of an optional user interface according to an embodiment of this disclosure.

FIG. 8B is a schematic diagram of an optional user interface according to an embodiment of this disclosure.

FIG. 9 is a schematic diagram of an optional user interface according to an embodiment of this disclosure.

FIG. 10 is a schematic diagram of an optional user interface according to an embodiment of this disclosure.

FIG. 11 is a schematic diagram of an optional configuration solution according to an embodiment of this disclosure.

DESCRIPTION OF EMBODIMENTS

To make solutions of this disclosure more comprehensible for a person skilled in the art, the technical solutions in embodiments of this disclosure are clearly and completely described below with reference to the accompanying drawings in the embodiments of this disclosure. Apparently, the described embodiments are merely some rather than all of the embodiments of this disclosure. All other embodiments obtained by a person skilled in the art based on the embodiments of this disclosure without creative efforts shall fall within the protection scope of this disclosure.

The terms such as "first" and "second" in the specification, claims, and foregoing accompanying drawings of this disclosure are intended to distinguish between similar objects rather than describe a particular sequence or a chronological order. It is to be understood that the data termed in such a way is interchangeable in proper circumstances, so that the embodiments of this disclosure described herein can be implemented in other orders than the orders illustrated or described herein. Moreover, the terms "include" and "have" and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, product, or device.

First, some nouns or terms that appear during descriptions of the embodiments of this disclosure are applicable to the following explanations:

A 3D game refers to a three-dimensional electronic game based on three-dimensional computer graphics, including, but not limited to, a multiplayer online 3D game, a single 3D game played by a single player, and a virtual reality game system established based on a 3D game system, and has a property of being generally applicable to platforms, where 3D games on a game console platform, a mobile phone game platform, and a PC game platform may be included.

A tactical competitive game refers to a game in which victory is sought through confrontation using tactical elements.

A client game refers to a conventional online game that can be played on a terminal, such as a computer or mobile phone, by downloading a client.

A viewer refers to a viewer that watches an e-Sports event by using a specified client or a web page or at an offline venue.

According to an aspect of the embodiments of this disclosure, a method embodiment of a configuration method for a virtual scene is provided.

Figure 1:
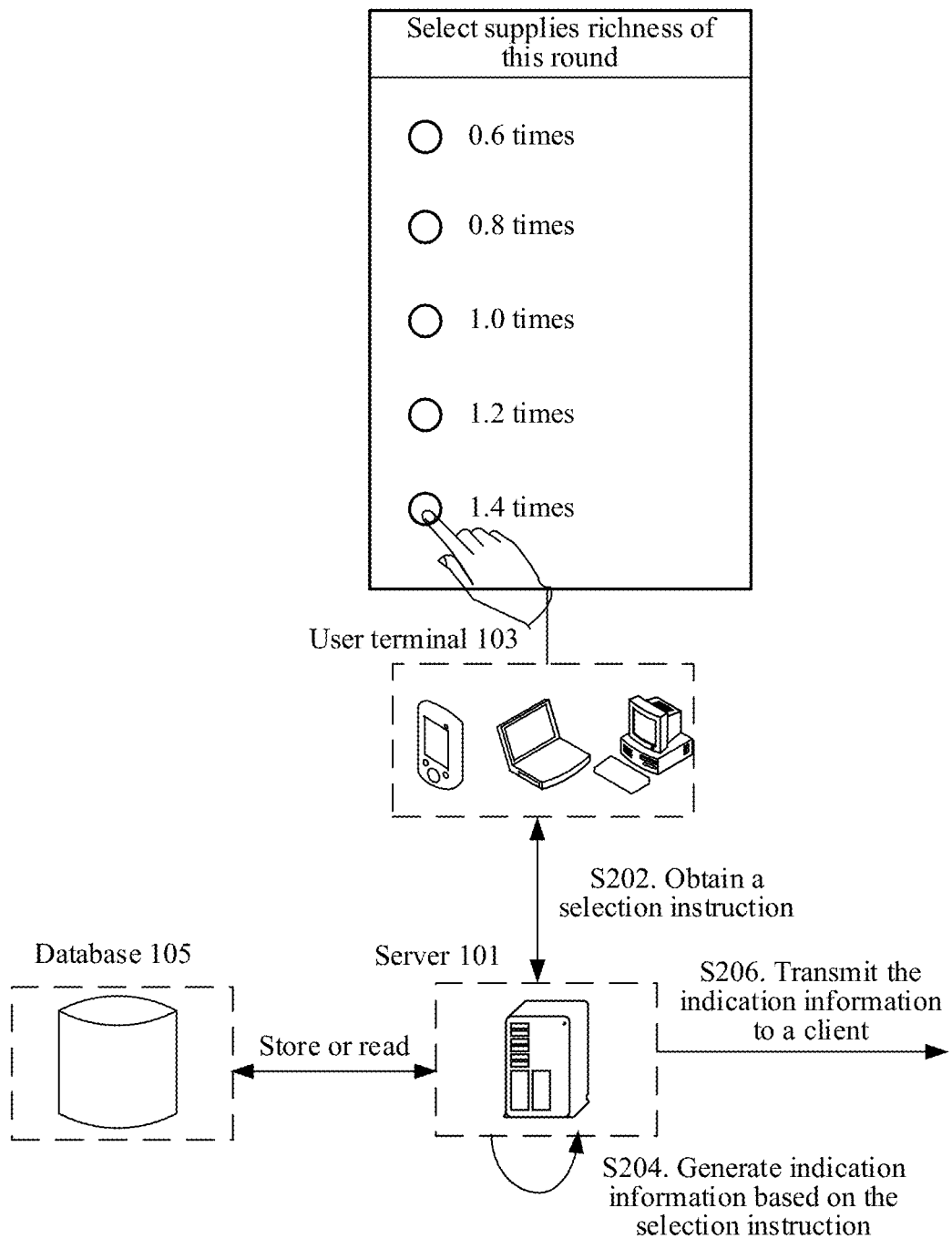
FIG. 1 is a schematic diagram of a hardware environment of a configuration method for a virtual scene according to an embodiment of this disclosure.

Optionally, in this embodiment, the foregoing configuration method for a virtual scene may be applied to a hardware environment including a server 101 and a terminal 103 (including a first terminal and a second terminal) as shown in FIG. 1. As shown in FIG. 1, the server 101, connected to the terminal 103 through a network, may be configured to provide a service (such as a game service or an event live streaming service) for the terminal 103 or a client installed on the terminal 103. A database 105 may be set on a server or independently of the server, and is configured to provide a data storage service for the server 101. The foregoing network includes, but is not limited to, a wide area network, a metropolitan area network, or a local area network, and the terminal 103 is not limited to a PC, a mobile phone, a tablet computer, and the like.

Figure 2:
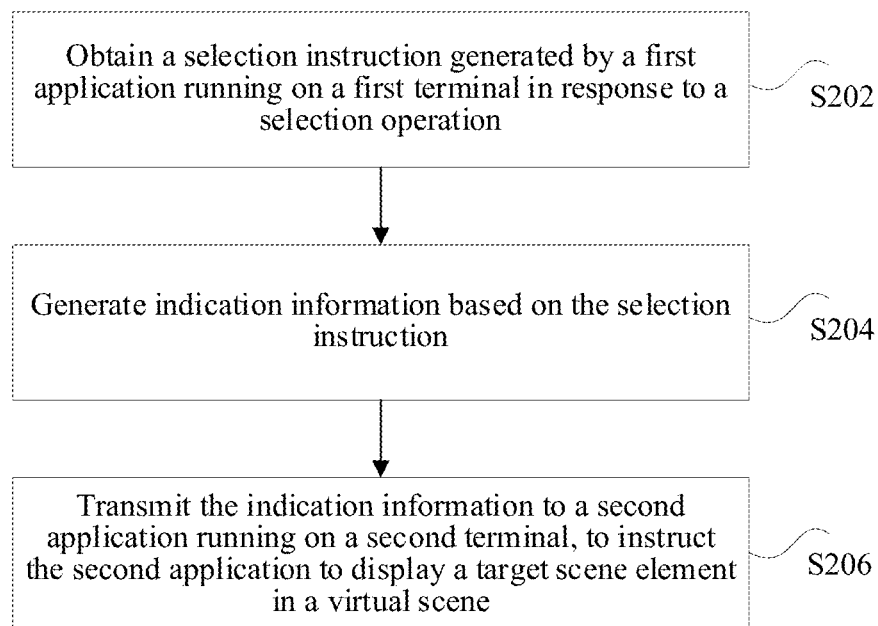
FIG. 2 is a flowchart of an optional configuration method for a virtual scene according to an embodiment of this disclosure.
Figure 3:
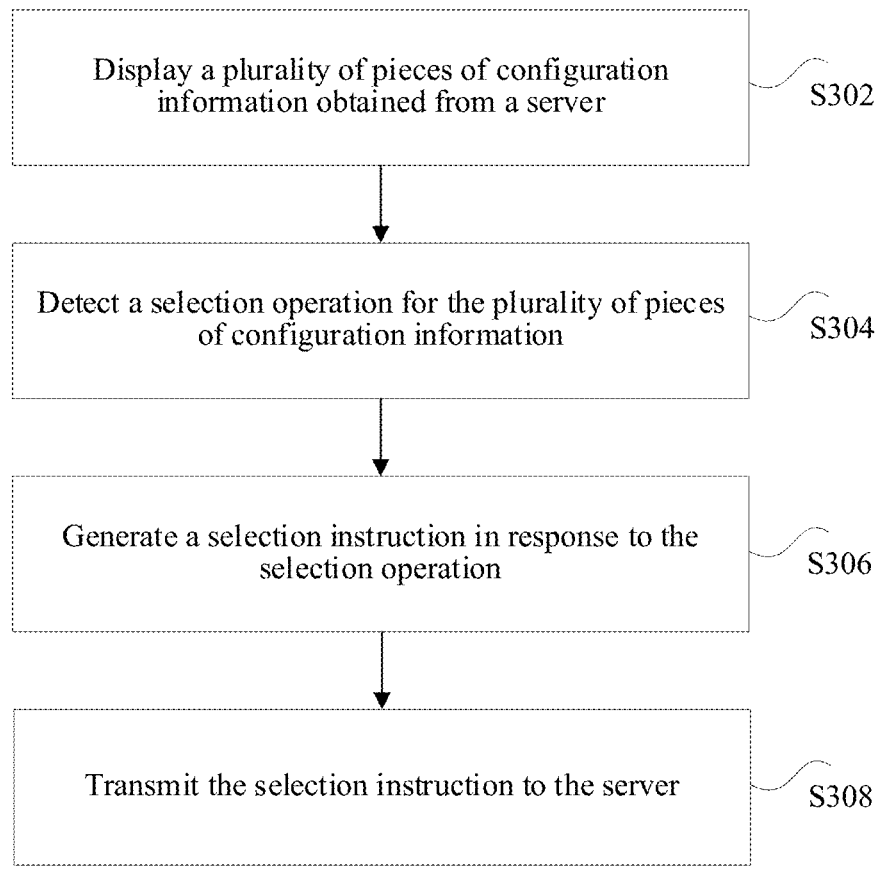
FIG. 3 is a flowchart of an optional configuration method for a virtual scene according to an embodiment of this disclosure.

The configuration method for a virtual scene in this embodiment of this disclosure may be performed by the server 101. FIG. 2 is a flowchart of an optional configuration method for a virtual scene according to an embodiment of this disclosure. As shown in FIG. 2, the method may include the following steps.

Step S202. A server obtains a selection instruction generated by an application running on a first terminal in response to a selection operation triggered by a user.

The foregoing server may be a server that provides an application service for a target application. The target application may be an application that can provide a virtual scene, for example, a game application, an event live streaming application, a medical simulation application, and a military simulation application. The following is described by using a game application as an example. The foregoing first terminal is a terminal through which activity information of an activity in the virtual scene can be viewed, that is, a terminal corresponding to a viewer. What corresponds to the first terminal is a second terminal, the second terminal being a terminal through which an activity can be participated in in the virtual scene, that is, a terminal corresponding to a streamer.

For example, in a game application, a user can enter a live streaming studio to launch a live streaming event. In this case, the user is a streamer, and other users entering the live streaming studio by using a studio number to watch a game process live streamed by the streamer are viewers of the live streaming studio. The viewer in the live streaming studio may further participate in interaction by using an interaction module provided by the application when watching live-streamed content.

The selection instruction includes configuration information selected by the user. The configuration information is used for configuring a scene element in the virtual scene and may be information for configuring the scene element or an attribute of the scene element. A plurality of pieces of configuration information may be considered as a plurality of options in a same interface. Each option has a corresponding configuration event, and the configuration event may be an event (different from a task executed by a target object controlled by the second terminal) in underlying logic of the target application. For example, in the game application, the event may be understood as a game progress or a part of the game progress, or further, for example, an event that generates a game item and a game behavior and that has impact on a player's game result in a tactical competitive game, and includes, but is not limited to, distribution of various supplies in the game, determining of an airdrop location, division of a player activity zone, and tactical elements (or referred to as scene elements) such as dynamic weather.

The foregoing plurality of scene elements may be any scene element in the virtual scene or a to-be-configured scene element.

Step S204. The server generates indication information based on the selection instruction, the indication information being used for indicating a target scene element in the plurality of scene elements.

Specifically, when there are a plurality of first terminals, the server may count, according to selection instructions transmitted by applications running on the plurality of first terminals respectively in response to selection operations of different users, a quantity of times that each scene element in a plurality of preset scene elements is selected, determine the target scene element according to the quantity of times that the each scene element in the plurality of preset scene elements is selected, and then generate the indication information used for indicating the target scene element.

For case of understanding, descriptions are provided by using a game application as an example. For example, the plurality of scene elements may be 0.6, 0.8, 1, or 1.2 times supplies richness. Quantities of times that the foregoing scene elements are selected are 23, 52, 18, and 41 in sequence. Therefore, the target scene element is determined as 0.8 times supplies richness, and indication information generated by the server is specifically 0.8 times supplies richness, indicating the supplies richness in a current game scene. In another example, the plurality of scene elements may be an initial flight route of an aircraft, including flight routes 1 to 5. Quantities of times that the foregoing scene elements are selected are 87, 36, 101, 43, and 55 in sequence. Therefore, the route of the target scene element is determined as the flight route 3, and the indication information generated by the server based on the selection instruction is specifically that the initial flight route of an aircraft is the flight route 3.

Step S206. The server transmits the indication information to an application running on the second terminal, to instruct the application running on the second terminal to display the target scene element in the virtual scene.

In view of the above, through the foregoing steps, during an operation process of the target application, for example, during an operation process of a round of a game, a progress of the round of the game may be affected by using the first terminal. When a viewer watches an e-Sports event by using a specified client or a web page on the first terminal or by using the first terminal at an offline venue, various game progresses of in the e-Sports event being watched may be affected by a selection operation such as voting.

The foregoing embodiment is described by using an example in which the configuration method for a virtual scene in this embodiment of this disclosure is performed by the server 101. The configuration method for a virtual scene in this embodiment of this disclosure may alternatively be performed by the terminal 103. A difference from the foregoing embodiment merely lies in that an execution body is changed from a server to a terminal. The configuration method for a virtual scene in this embodiment of this disclosure may alternatively be jointly performed by the server 101 and the terminal 103. The terminal 103 performs one or two steps of step S202 to step S206, and the server performs the remaining steps. For example, the terminal 103 performs step S202, and the server performs step S204 to step S206. The configuration method for a virtual scene in this embodiment of this disclosure performed by the terminal 103 may alternatively be performed by a client installed on the terminal 103.

Through the foregoing step S202 to step S206, when the second terminal controls the target object in the virtual scene displayed on the client, the scene element in the virtual scene can be configured on the first terminal through a triggered selection operation. In other words, during a process in which the second terminal runs an application providing a virtual scene, the first terminal may affect a scene element in the virtual scene, so that the technical problem that a setting manner is relatively undiversified in the related art can be resolved, thereby improving flexibility of setting.

In the technical solution provided by step S202 in this application, the viewer may select configuration information from the plurality of pieces of configuration information through the selection operation triggered on the first terminal (equivalent to selecting a corresponding scene element by performing the selection operation to vote). When the selection is completed by the viewer, the first terminal detects the selection operation for the plurality of pieces of configuration information and generates the selection instruction in response to the selection operation, the selection instruction including the configuration information selected by the user. The server may obtain the selection instruction, generates indication information according to the selection instruction, transmits the indication information to an application running on the second terminal, and configures the scene element (such as a flight route of a character of a player or supplies allocation in the virtual scene) in a game scene (that is, the virtual scene) on the second terminal of the player. In the related art, in various e-Sports events held, a viewer can only watch an event process of a player, and has a relatively low sense of participation. However, if a view voting function of this solution is adopted, the viewer may affect refresh locations and refresh times of various tactical elements by voting, so that the viewer has higher enthusiasm in watching the game and stickiness of the viewer to the event is improved. Moreover, when facing the mechanism, the player may use different game policies according to an on-site situation, so that the event is more enjoyable.

Optionally, before the selection operation triggered on the first terminal is obtained, the viewer may vote in the following manner: A round of a game may be divided into several stages, the several stages including a first running stage and a second running stage that are sequentially arranged in chronological order (a starting time of the second running stage is not earlier than an ending time of the first running stage). In a case that a round of a game (that is, a target task) running on a client is in the first running stage, the server transmits configuration information used for representing a plurality of scene elements to the first terminal. In a process in which the first terminal displays game information (for example, a live streamed game screen) of the first running stage of the round of the game, that is, in a process in which the viewer watches the game, the first terminal may further display a plurality of pieces of to-be-selected configuration information, so that the viewer can perform the selection operation on the plurality of pieces of configuration information (herein, each piece of configuration information may be used for configuring one or more scene elements, and scene elements or attributes of the scene elements configured by using any two pieces of the configuration information are not completely the same) to vote on the first terminal of the viewer. In a case that the round of the game running on a client on the second terminal is in the second running stage, the plurality of pieces of configuration information are used for configuring the virtual scene of the round of the game, that is, the viewer may determine the game progress of the game in a stage following the first running stage.

In an optional embodiment, in a case that the server transmits the plurality of pieces of configuration information to the first terminal, the type of elements configured by using the transmitted configuration information may be mainly classified into two main types as follows.

First type: In a case that element types of the plurality of scene elements are the first type, the configuration information used for representing a plurality of scene elements of the first type is transmitted to a plurality of first terminals. The scene element of the first type may be a global scene element (for example, a global tactical element in a game application) having impact on a plurality of objects in the virtual scene, the plurality of objects being objects controlled by a plurality of terminals, each terminal in the plurality of terminals being configured to control an object in the plurality of objects. The plurality of terminals include the second terminal, and the plurality of objects include the target object. The scene element may be the global tactical element, and includes, but is not limited to: an initial flight route of an aircraft, supplies richness of the round of the game, geographical distribution of all safe zones, and dynamic weather.

Second type: In a case that element types of the plurality of scene elements are the second type, the configuration information used for representing a plurality of scene elements of the second type is transmitted to the first terminal. The scene element of the second type may be a random scene element (for example, a random tactical element in a game application) in the virtual scene. The random tactical element includes, but is not limited to, refresh locations of airdropped supplies, frequencies of the airdropping supplies, categories included in the airdropped supplies, and refresh locations and frequencies of some advanced supplies.

For the global scene element, the server may sequentially transmit a plurality of pieces of configuration information of the global scene element to the application running on the first terminal at a specified time point before the application running on the second terminal is to display the scene element in a case that the application running on the second terminal is in a preset first running stage.

For the random scene element, the server may randomly transmit a plurality of pieces of configuration information of the random scene element to the application running on the first terminal according to a scene correlation between a historical scene element in the application running on the second terminal and the random scene element.

The plurality of pieces of configuration information in this application may be used for configuring a plurality of different scene elements, the plurality of different scene elements may be a plurality of scene elements of the same type, for example, an initial flight route of an aircraft, supplies richness of the round of this round of a game, and geographical distribution of all safe zones. The plurality of different scene elements may alternatively be a plurality of scene elements of different types, for example, an initial flight route of an aircraft, supplies richness of this round of a game, refresh locations of airdropped supplies, and frequencies of the airdropped supplies. The plurality of configuration information in this application may further be used for configuring the same scene element, for example, configuring a plurality of initial flight routes of an aircraft, various supplies richness of this round of a game, geographical distribution of various safe zones, a plurality of types of dynamic weather.

In the foregoing embodiment, the transmitting the configuration information used for representing a plurality of scene elements of the first type to a plurality of first terminals includes at least one of the following:

1) transmitting the plurality of pieces of configuration information used for representing a plurality of scene elements to the first terminal, quantities of props configured by using any two of the plurality of pieces of configuration information in the virtual scene being different, in other words, the configuration information being used for configuring supplies richness of the round of the game, that is, a quantity of supplies;
2) transmitting the plurality of pieces of configuration information used for representing a plurality of scene elements to the first terminal, moving trajectories of transport vehicle configured by using any two of the plurality of pieces of configuration information in the virtual scene being different, the transport vehicle being configured to transport a plurality of objects and including, but not limited to, an aircraft, a tank, a car, and the like, and by using an aircraft as an example, the configuration information being used for configuring an initial flight route of an aircraft;
3) transmitting the plurality of pieces of configuration information used for representing a plurality of scene elements to the first terminal, safe zones configured by using any two of the plurality of pieces of configuration information in the virtual scene being different, the safe zone being a zone in which no harm is caused to life attributes of a plurality of objects, in other words, the configuration information being used for configuring geographical distribution of various safe zones; and 4) transmitting the plurality of pieces of configuration information used for representing a plurality of scene elements to the first terminal, weather environments configured by using any two of the plurality of pieces of configuration information in the virtual scene being different, in other words, the configuration information being used for configuring an option of dynamic weather.

That is, the server may transmit, in a unified manner, a plurality of pieces of configuration information of at least one element in a plurality of pieces of configuration information of a virtual prop element, a plurality of pieces of configuration information of a moving trajectory of a virtual transport vehicle, a plurality of pieces of configuration information of a safe zone, and a plurality of pieces of configuration information of a weather environment to the application running on the first terminal at the specified time point before the application running on the second terminal is to display a global game scene element.

Optionally, when the plurality of pieces of configuration information are transmitted to the first terminal, because the configuration information is equivalent to voting selection information, to improve voting efficiency, a decentralized voting method may be adopted: classifying all first terminals running the application into two types; transmitting a plurality of pieces of first-type configuration information for the scene element in the virtual scene to the application running on the first terminal of a first type, and transmitting a plurality of pieces of second-type configuration information for the scene element in the virtual scene to the application running on the first terminal of a second type, the first-type configuration information and the second-type configuration information being configured respectively for different attributes of the scene element in the virtual scene.

In an example, the server may transmit first configuration information in the plurality of pieces of configuration information to some of all the first terminals, and transmit second configuration information in the plurality of pieces of configuration information to the remaining terminals in all the first terminals. The types and/or attributes of props configured by using the first configuration information and the second configuration information in the virtual scene are different. For example, in a case that the prop configured by using the first configuration information is an aircraft, and the prop configured by using the second configuration information is a tank, a quantity of aircraft configured by using the first configuration information is 1.2*X (X is a given base), and a quantity of tanks configured by the second configuration information being 1.5*X.

For example, in a case that the server transmits the configuration information used for representing of a plurality of scene elements of the second type to the first terminal: the first configuration information in the plurality of pieces of configuration information may be transmitted to some of all the first terminals, types of props configured by using any two pieces of the first configuration information in the virtual scene being different; and a plurality of pieces of the second configuration information are transmitted to the remaining terminals in all the first terminals, appearance locations of props configured by using any two pieces of the second configuration information in the virtual scene being different.

In the technical solution provided by step S204, the server generates the indication information based on the selection instruction, the indication information being used for indicating the target scene element in the plurality of scene elements.

Optionally, there may be a plurality of the selection instructions. A quantity of times that each scene element in the plurality of scene elements is selected is determined according to the plurality of the selection instructions, the plurality of the selection instructions being respectively generated by triggering the selection operations on a plurality of first terminals. That is, each first terminal may trigger a selection operation. The target scene element in the plurality of scene elements is determined according to the quantity of times that each scene element in the plurality of scene elements is selected. The indication information used for indicating the target scene element is generated.

In the foregoing embodiments, a plurality of the selection operations are respectively triggered on the plurality of first terminals, including: determining a scene element selected the most times by the plurality of the selection operations in the plurality of scene elements as the target scene element, that is, counting a quantity of times that each scene element is voted for, the scene element having the highest votes being a target task; or determining a weight ki (ki represents a weight of the $i^{th}$ task) of the each scene element according to a quantity of times that the each scene element is selected by the plurality of the selection operations in the plurality of scene elements, performing weighted summation according to a parameter configured for the each scene element and the weight of the each scene element to obtain a reference value, and determining a scene element having a parameter closest to the reference value as the target scene element.

An optional weight determining method is: counting a total quantity of voting times P and a quantity pi of times (or referred to as the quantity of times of being selected) that the each scene element is voted for, so that a weight is ki=pi/P, determining the target scene element in the plurality of scene elements according to a product of a parameter configured for the each scene element and the weight of the each scene element, a parameter mi (mi represents a parameter configured for the $i^{th}$ scene element) configured for the each scene element may be determined according to an actual situation, for example, a quantity of props and locations of props, then calculating $f=\Sigma_{i=1}^{n}(ki*mi)$, n representing a quantity of tasks, and using a scene element having a parameter closest to f as the target scene element.

In the technical solution provided by step S206, the server transmits the indication information to a client installed on the second terminal, to instruct the client to display the target scene element in the virtual scene. The second terminal is configured to control a target object in the virtual scene displayed on the client, the second terminal being different from the first terminal.

In a case that an application running on the second terminal is a web application (or referred to as an online application), the server transmits the indication information to a browser installed on the second terminal, to instruct the browser to display the target scene element in the virtual scene.

Optionally, after the indication information is transmitted to the client installed on the second terminal, the server may transmit feedback information to an application running on the first terminal, the feedback information being used for feeding back whether the scene element that is indicated by the selection instruction and that is selected by a user is the target scene element.

The configuration method for a virtual scene in this embodiment of this disclosure may be performed by a first terminal. The method may include the following steps.

Step S302. Display a plurality of pieces of configuration information obtained from a server, the configuration information being used for configuring a scene element in the virtual scene.

Optionally, the plurality of pieces of configuration information obtained from the server are displayed. In a case that a target task running on a client is in a first running stage, the plurality of pieces of configuration information are obtained from the server and are displayed.

Step S304. Detect a selection operation for the plurality of pieces of configuration information. Step S306. Generate a selection instruction in response to the selection operation, the selection instruction including configuration information that is selected by a user and that is used for determining a target scene element.

Step S308. Transmit the selection instruction to the server, and determine, through the server based on the selection instruction, the target scene element and generate indication information, to instruct an application running on a second terminal to display the target scene element in the virtual scene.

Optionally, the instructing, through the server, the client on the second terminal to display the target scene element in the virtual scene includes: instructing, through the server, the client to display the target scene element in the virtual scene in a case that the target task that is run is in a second running stage, a starting time of the second running stage being not earlier than an ending time of the first running stage.

Optionally, the displaying a plurality of pieces of configuration information obtained from a server includes: making a scene element selection page pop up on an application page of an application running on the first terminal in a case that the application running on the second terminal is in a preset first running stage, and displaying the plurality of pieces of configuration information obtained from the server on the scene element selection page.

Specifically, the first terminal may make the scene element selection page pop up on the application page of the application running on the first terminal in a case that the application running on the second terminal is in the preset first running stage, and sequentially display a plurality of pieces of configuration information of each global scene element obtained from the server.

Certainly, the first terminal may further receive a plurality of pieces of configuration information of a to-be-displayed random scene element randomly transmitted by the server according to a scene correlation between a historical scene element in the application running on the second terminal and the random scene element, make the scene element selection page pop up on the application page of the application running on the local terminal, and displaying the plurality of pieces of configuration information of the random scene element on the scene element selection page.

For a game application, the displaying the plurality of pieces of configuration information of the random scene element on the scene element selection page may be specifically displaying, on the scene element selection page, at least one of the following: a plurality of pieces of configuration information of a virtual prop element, a plurality of pieces of configuration information of a moving trajectory of a virtual transport vehicle, a plurality of pieces of configuration information of a safe zone, and a plurality of pieces of configuration information of a weather environment.

In a case that element types of a plurality of scene elements are the first type, a plurality of pieces of configuration information used for representing the plurality of scene elements of the first type are displayed on the first terminal, a scene element of the first type being used for representing a global element having impact on a plurality of objects in the virtual scene, the plurality of objects being objects controlled by a plurality of terminals, each terminal in the plurality of terminals being configured to control an object in the plurality of objects, the plurality of terminals including the second terminal, and the plurality of objects including the target object; and/or in a case that element types of the plurality of scene elements are the second type, a plurality of pieces of configuration information used for representing the plurality of scene elements of the second type are displayed on the first terminal, a scene element of the second type being used for representing a random element in the virtual scene.

The displaying, on the first terminal, a plurality of pieces of configuration information used for representing the plurality of scene elements of the first type includes at least one of the following: displaying, on the first terminal, a plurality of pieces of configuration information used for configuring props in the virtual scene, quantities of props configured by using any two of the plurality of pieces of configuration information in the virtual scene being different; displaying, on the first terminal, a plurality of pieces of configuration information used for configuring a moving trajectory of a transport vehicle in the virtual scene, moving trajectories of transport vehicle configured by using any two of the plurality of pieces of configuration information in the virtual scene being different, and the transport vehicle being configured to transport a plurality of objects; displaying, on the first terminal, a plurality of pieces of configuration information used for configuring a safe zone in the virtual scene, safe zones configured by using any two of the plurality of pieces of configuration information in the virtual scene being different, the safe zone being a zone in which no harm is caused to life attributes of a plurality of objects; and displaying, on the first terminal, a plurality of pieces of configuration information used for configuring a weather environment in the virtual scene, weather environments configured by using any two of the plurality of pieces of configuration information in the virtual scene being different.

After the server instructs the client on the second terminal to display the target scene element in the virtual scene, the first terminal may further obtain feedback information transmitted by the server, and display the feedback information through the application running on the first terminal, the feedback information being used for feeding back whether the scene element that is indicated by the selection instruction and that is selected by a user is the target scene element.

The configuration method for a virtual scene in this embodiment of this disclosure may be performed by a second terminal. The method may include the following steps.

The second terminal obtains indication information transmitted by a server, the indication information being generated by the server by selecting, according to a selection operation of a first terminal, configuration information from a plurality of pieces of configuration information by the server, the configuration information being used for configuring a scene element in the virtual scene.

Optionally, the indication information may be obtained in a case that a target task running on a client is in a first running stage.

A client on the second terminal displays a target scene element in the virtual scene according to an instruction of the indication information, the second terminal being configured to control a target object in the virtual scene displayed on the client, the second terminal being different from the first terminal.

Optionally, the target scene element may be configured in the virtual scene of the target task in a case that the target task running on the client is in a second running stage, to display the target scene element in the virtual scene, a starting time of the second running stage being not earlier than an ending time of the first running stage.

In an optional embodiment, the technical solution of this disclosure is described below in detail with reference to the specific implementations.

When a viewer watches a game event through a live streaming client or a live streaming website, a tactical element selection page pops up irregularly on the client or a web page during the event. The tactical element mainly includes two types: a global tactical element and a random tactical element. The global tactical element is a tactical element that has impact on all players, and a selection page pops up regularly when the element is needed to function. For the random tactical element, selection pages pop up according to a size of a category in sequence for the viewer to make choices and finally determine a specific item of the random tactical element.

The global tactical elements may include: an initial flight route of an aircraft, supplies richness of this round of the game, geographical distribution of all safe zones, dynamic weather, and the like. When watching this round of the game event, the viewer may vote in real time (that is, perform the selection operation) for an alternative option in 40 s (equivalent to the foregoing first running stage) before each tactical element is to function. A voting result finally determines a result of the tactical element. The viewer has 30 s to vote for an alternative option, and the option having the most votes becomes the result of the tactical element.

An optional order for global elements to appear is as follows.

Figure 4:
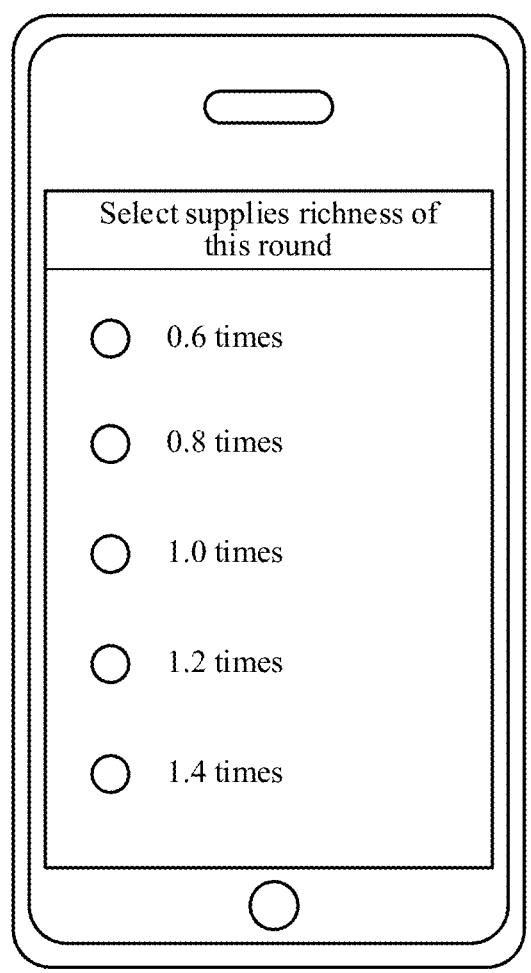
FIG. 4 is a schematic diagram of an optional user interface according to an embodiment of this disclosure.

For the supplies richness of this round of the game shown in FIG. 4, five alternative options pop up on a viewing interface for viewers, the five options being respectively 0.6 times, 0.8 times, 1 times, 1.2 times, and 1.4 times normal supplies richness. After the viewers make choices, the server allocates the supplies all over a map according to the times having the most votes from the viewers.

Figure 5:
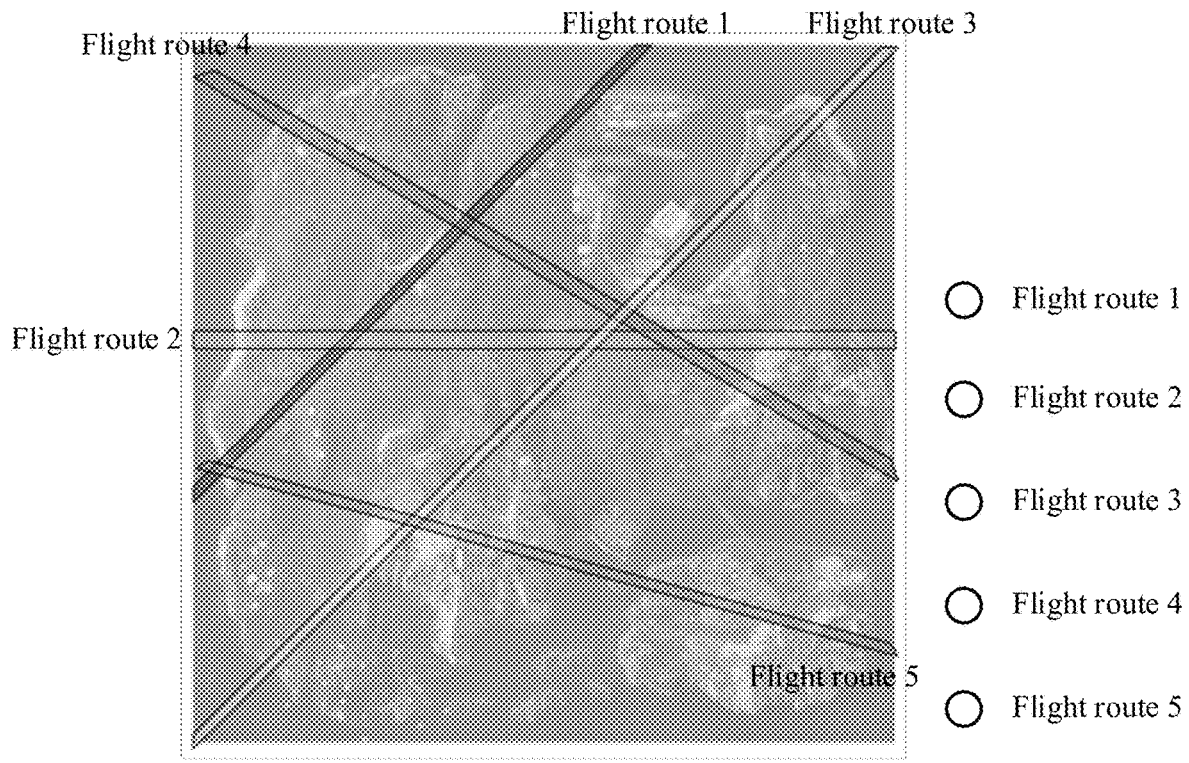
FIG. 5 is a schematic diagram of an optional user interface according to an embodiment of this disclosure.

For the initial flight route of an aircraft shown in FIG. 5, a viewing interface for viewers may pop up on a map interface, and display a plurality of (for example, five) different flight routes, and options corresponding to the flight routes pop up. After the viewers make choices, the server arranges the flight route according to the flight route having the most votes from the viewers.

Figure 6:
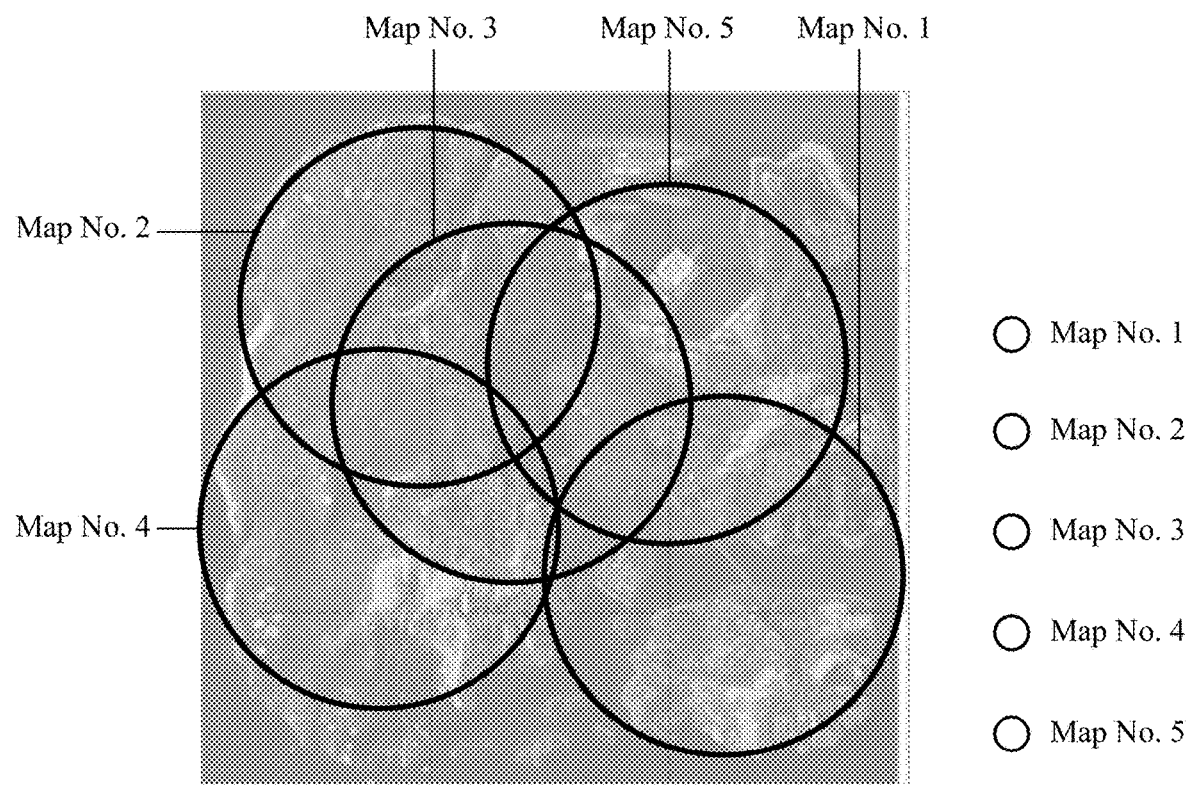
FIG. 6 is a schematic diagram of an optional user interface according to an embodiment of this disclosure.

For the distribution of safe zones shown in FIG. 6, a map interface pops up on a live streaming interface in 40 s before each safe zone is refreshed, and displays a plurality of (for example, five) different geographical location options of a next safe zone refresh. After the viewers make choices, the server refreshes the safe zones according to geographical distribution of the safe zones having the most votes from the viewers.

For the dynamic weather option shown in FIG. 7, the option appears throughout game process. Except for that initial weather is assigned by the server, each subsequent weather change may be selected by the viewers through voting in a plurality of (for example, five) alternative weather options and be displayed in a weather forecast box in an upper left corner of the game.

The foregoing random tactical elements may include: a refresh location of an airdrop, a frequency of the airdrop, categories of items included in the airdrop, and refresh locations and frequencies of some advanced supplies. In this round of the game, refresh location and frequency options of advanced supplies in the random tactical elements may appear following supplies richness options of this round of the game in the global tactical elements. The refresh location of the airdrop and categories included in the airdrop may appear randomly in the game.

For the refresh locations and categories of the advanced supplies, there are many categories of advanced supplies in the game, and the advanced supplies may be distributed widely. Therefore, the foregoing voting manner for the global tactical element is not to be used, and a decentralized voting manner may be used instead. That is, the viewers are divided into 2N groups randomly, and viewers of every two groups are respectively responsible for a refresh location and a refresh category of an advanced supply. An optional operation method is as follows.

The system divides the viewers into 2N groups randomly, and the viewers of the 2N groups determine refresh locations and refresh categories of N advanced supplies granted in this round of the game. Every two groups determine an advanced supply, and one group of viewers in the two groups of viewers determine a refresh location of the supply. As shown in FIG. 8A, the system provides five alternative locations in a part of a map for this group, and the viewers of the group select the refresh location of the supply through voting, the refresh location being a location having the most votes. The viewers of the other group determine the refresh category of the supply, and the system provides alternative options of five advanced supplies randomly. As shown in FIG. 8B, the viewers of the group select the refresh category of the supply through voting, the refresh category being the category having the most votes.

For a refresh location of and categories included in the airdrop, during viewing of a round of the game, the options pop up randomly, and each time the options pop up, the viewers make two choices. As shown in FIG. 9 and FIG. 10, an airdrop location and items included in the airdrop are selected respectively, where the items included in the airdrop are in different combinations prepared in advance. After the viewers make choices, the server delivers the airdrop according to the location and categories that are selected the most times by the viewer.

Functions of the foregoing solutions may be completed by coordination between a live streaming client on the first terminal and a server. As shown in FIG. 11, a server 1101 generates a tactical element option and transmits the option to a live streaming client 1103. The live streaming client 1103 is responsible for allocating all tactical element option windows and collecting statistics of related option data, for example, collecting statistics of player selections and transmitting the statistics to the server. The server 1101 is responsible for generating related options and generating related tactical elements according to a result transmitted by the live streaming client 1103.

The server 1101 generates the tactical element option and transmits the option to the live streaming client 1103. The server 1101 may monitor in real time a stage (that is, a first running stage) that a client of a target application is in, to determine whether there is a subsequent stage (that is, a second running stage) in which tactical elements need to be configured. If it is determined that voting needs to be performed in the first running stage (that is, there is an element that needs to be configured in the second running stage), the tactical elements (or referred to as scene elements) for which voting is needed in a next stage are obtained, a plurality of pieces of configuration information used for representing to-be-configured scene elements are generated, and the tactical elements are transmitted to each live streaming client (that is, the live streaming client on the first terminal) in a form of configuration information.

Each first terminal votes within a valid time (for example, within a time period of the first running stage or before arrival of the second running stage), that is, selects the configuration information, and after completing the selection, the first terminal transmits the selected configuration information to the server 1101.

The server 1101 counts votes in the valid time, to determine a final voting result, that is, a target scene element finally selected.

Before arrival of the second running stage, the server 1101 is configured to transmit indication information used for representing the target scene element to each second terminal, to display the target scene element in the virtual scene on the second terminal when the second running stage arrives.

After the solution in this disclosure is adopted, the sense of participation of ordinary viewers in e-Sports events is improved, and more game viewers may be attracted to become potential game users, enabling wider promotion of the e-Sports events. In addition, voting of the viewers makes randomness and topicality of the events stronger, and improves watching experience of the viewers.

To make the description simple, the foregoing method embodiments are stated as a series of action combinations. However, a person skilled in the art needs to learn that this disclosure is not limited to the described sequence of the actions, because according to this disclosure, some steps may use another sequence or may be simultaneously performed. In addition, it is to be understood by a person skilled in the art that the embodiments described in the specification are all exemplary embodiments and the related actions and modules are not mandatory to this disclosure.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this disclosure essentially, or the part contributing to the related art may be embodied in the form of a software product. The computer software product is stored in a storage medium (for example, a read-only medium (ROM)/a random access memory (RAM), a magnetic disk, or an optical disc), and includes several instructions for instructing a terminal device (which may be a mobile phone, a computer, a server, or a network device) to perform the methods according to the embodiments of this disclosure.

Figure 12:
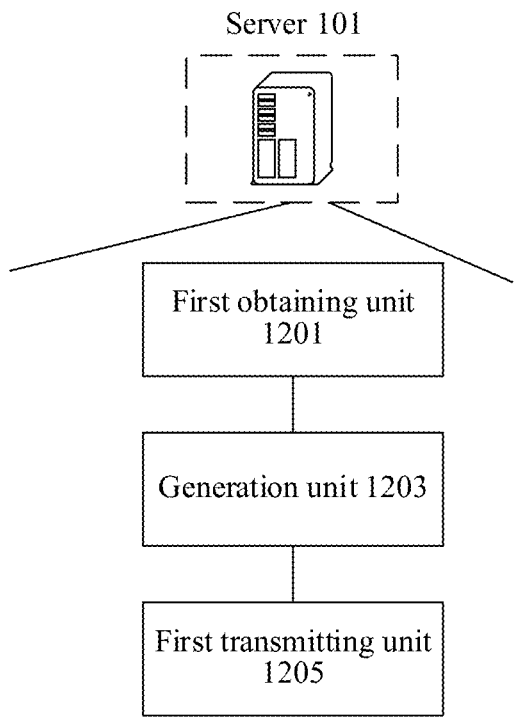
FIG. 12 is a schematic diagram of an optional configuration apparatus for a virtual scene according to an embodiment of this disclosure.

According to another aspect of the embodiments of this disclosure, a configuration apparatus for a virtual scene is further provided to perform the foregoing configuration method for a virtual scene. FIG. 12 is a schematic diagram of an optional configuration apparatus for a virtual scene according to an embodiment of this disclosure. As shown in FIG. 12, the apparatus may include: a first obtaining unit 1201, configured to obtain a selection instruction generated by an application running on a first terminal in response to a selection operation triggered by a user, the selection instruction including configuration information selected by the user, the configuration information being used for configuring a scene element in the virtual scene; a generation unit 1203, configured to generate indication information according to the selection instruction, the indication information being used for indicating a target scene element in a plurality of scene elements; and a first transmitting unit 1205, configured to transmit the indication information to an application running on a second terminal, to instruct the application running on the second terminal to display the target scene element in the virtual scene.

The first obtaining unit 1201 in this embodiment may be configured to perform step S202 in the embodiments of this disclosure, the generation unit 1203 in this embodiment may be configured to perform step S204 in the embodiments of this disclosure, and the transmitting unit 1205 in this embodiment may be configured to perform step S206 in the embodiments of this disclosure.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware.

By the foregoing modules, when the second terminal controls the target object in the virtual scene displayed on the client, the scene element in the virtual scene can be configured on the first terminal by the selection operation triggered. In other words, during the process of running the application providing the virtual scene by the second terminal, the first terminal may affect the scene element in the virtual scene, so that the technical problem that the setting method is relatively undiversified in the related art can be resolved, and the technical effect of improving the flexibility of the setting can be achieved.

In the foregoing embodiment, the generation unit 1203 may be configured to: count, according to selection instructions transmitted by applications running on a plurality of first terminals respectively in response to selection operations of different users, a quantity of times that each scene element in a plurality of preset scene elements is selected; determine the target scene element according to the quantity of times that the each scene element in the plurality of preset scene elements is selected; and generate the indication information used for indicating the target scene element.

Optionally, the apparatus in this disclosure may further include a second transmitting unit, configured to: sequentially transmit a plurality of pieces of configuration information of a global scene element to the application running on the first terminal at a specified time point before the application running on the second terminal is to display the scene element in a case that the application running on the second terminal is in a preset first running stage; and/or randomly transmit a plurality of pieces of configuration information of a to-be-displayed random scene element to the application running on the first terminal according to a scene correlation between a historical scene element in the application running on the second terminal and the random scene element.

Optionally, the second transmitting unit is specifically configured to: transmit, in a unified manner, a plurality of pieces of configuration information of at least one element in a plurality of pieces of configuration information of a virtual prop element, a plurality of pieces of configuration information of a moving trajectory of a virtual transport vehicle, a plurality of pieces of configuration information of a safe zone, and a plurality of pieces of configuration information of a weather environment to the application running on the first terminal at the specified time point before the application running on the second terminal is to display a global game scene element.

Optionally, the apparatus in this disclosure may further include a third transmitting unit, configured to: classify all first terminals running the application into two types; transmit a plurality of pieces of first-type configuration information for the scene element in the virtual scene to the application running on the first terminal of a first type, and transmit a plurality of pieces of second-type configuration information for the scene element in the virtual scene to the application running on the first terminal of a second type, the first-type configuration information and the second-type configuration information being configured respectively for different attributes of the scene element in the virtual scene.

Optionally, the generation unit 1203 is specifically configured to: determine a scene element selected the most times as the target scene element; or determine a weight of the each scene element according to the quantity of times that the each scene element in the plurality of preset scene elements is selected, perform weighted summation according to a parameter configured for the each scene element and the weight of the each scene element to obtain a reference value, and determine a scene element having a parameter closest to the reference value as the target scene element.

Optionally, the apparatus in this disclosure may further include a feedback unit, configured to transmit feedback information to the application running on the first terminal, the feedback information being used for feeding back whether the scene element that is indicated by the selection instruction and that is selected by the user is the target scene element.

According to another aspect of the embodiments of this disclosure, a configuration apparatus for a virtual scene is further provided to perform the foregoing configuration method for a virtual scene. The apparatus may be applied to a first terminal. The apparatus may include: a display unit, configured to display a plurality of pieces of configuration information obtained from a server, the configuration information being used for configuring a scene element in a virtual scene; a detection unit, configured to detect a selection operation on a local terminal, and generate a selection instruction in response to the selection operation, the selection instruction including configuration information that is selected by a user and that is used for determining a target scene element; and an indication unit, configured to transmit the selection instruction to the server, and determine, through the server based on the selection instruction, the target scene element and generate indication information, to instruct an application running on a second terminal to display the target scene element in the virtual scene.

Optionally, the indication unit may further be configured to instruct, through the server, a client to display the target scene element in the virtual scene in a case that the target task that is run is in a second running stage, a starting time of the second running stage being not earlier than an ending time of a first running stage.

Optionally, the display unit is configured to: make a scene element selection page pop up on an application page of an application running on a local terminal in a case that the application running on the second terminal is in a preset first running stage, and display the plurality of pieces of configuration information obtained from the server on the scene element selection page.

Optionally, the display unit is specifically configured to: make the scene element selection page pop up on the application page of the application running on the local terminal in a case that the application running on the second terminal is in the preset first running stage, and sequentially display a plurality of pieces of configuration information of each global scene element obtained from the server; and/or receive a plurality of pieces of configuration information of a to-be-displayed random scene element randomly transmitted by the server according to a scene correlation between a historical scene element in the application running on the second terminal and the random scene element, make the scene element selection page pop up on the application page of the application running on the local terminal, and display the plurality of pieces of configuration information of random scene element on the scene element selection page.

Optionally, the display unit is specifically configured to display, on the scene element selection page, at least one of the following: a plurality of pieces of configuration information of a virtual prop element, a plurality of pieces of configuration information of a moving trajectory of a virtual transport vehicle, a plurality of pieces of configuration information of a safe zone, and a plurality of pieces of configuration information of a weather environment.

The display unit may be further configured to obtain feedback information transmitted by the server, the feedback information being used for feeding back whether the scene element that is indicated by the selection instruction and that is selected by the user is the target scene element, and display the feedback information through the application running on the first terminal.

According to another aspect of the embodiments of this disclosure, a configuration apparatus for a virtual scene is further provided to perform the foregoing configuration method for a virtual scene. The apparatus may be applied to a second terminal. The apparatus may include: a second obtaining unit, configured to obtain indication information transmitted by a server, the indication information being generated by the server by selecting, according to a selection operation of a first terminal, configuration information from a plurality of pieces of configuration information by the server, the configuration information being used for configuring a scene element in the virtual scene.

Optionally, the second obtaining unit may further be configured to obtain the indication information in a case that a target task running on a client is in a first running stage.

A scene display unit is configured to display a target scene element in the virtual scene on the client of the second terminal according to an instruction of the indication information, the second terminal being configured to control a target object in the virtual scene displayed on the client, the second terminal being different from the first terminal.

Optionally, the scene display unit may be further configured to configure the target scene element in the virtual scene of the target task in a case that the target task running on the client is in a second running stage, to display the target scene element in the virtual scene, a starting time of the second running stage being not earlier than an ending time of a first running stage.

When a player watches a game event through a live streaming client or a live streaming website, a tactical element selection page pops up irregularly on the client or a web page during the event. The tactical element mainly includes two types: a global tactical element and a random tactical element. The global tactical element is a tactical element that has impact on all players, and a selection page pops up regularly when the element is needed to function.

For the random tactical element, selection pages pop up according to a size of a category in sequence for the player to make choices and finally determine a specific item of the random tactical element.

After the solution in this disclosure is adopted, the sense of participation of ordinary viewers in e-Sports events is improved, and more game viewers may be attracted to become potential game users, enabling wider promotion of the e-Sports events. In addition, voting of the viewers makes randomness and topicality of the events stronger, and improves watching experience of the viewers.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this disclosure, a server or a terminal for implementing the foregoing configuration method for a virtual scene is further provided.

Figure 13:
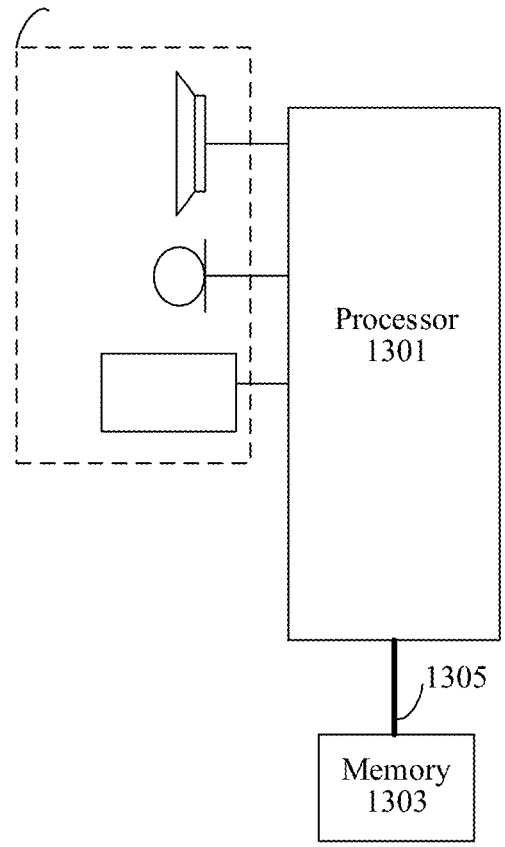
FIG. 13 is structural block diagram of a terminal according to an embodiment of this disclosure.

FIG. 13 is a structural block diagram of a server according to an embodiment of this disclosure. As shown in FIG. 13, the server may include: one or more (only one is shown) processor 1301, a memory 1303, and a transmission apparatus 1305. As shown in FIG. 13, the server may further include an input/output device 1307.

The memory 1303 may be configured to store a software program and a module, such as a program instruction/module corresponding to the configuration method and the apparatus for a virtual scene in the embodiments of this disclosure. The processor 1301 executes various functional applications and data processing by running the software program and the module that are stored in the memory 1303, to implement the foregoing configuration method for a virtual scene. The memory 1303 may include a high-speed random memory, and may also include a nonvolatile memory such as one or more magnetic storage apparatuses, a flash memory, or another nonvolatile solid-state memory. In some examples, the memory 1303 may further include memories disposed remote to the processor 1301, and the memories may be connected to the server through a network. An example of the network includes, but is not limited to, the Internet, an intranet, a local area network, a mobile communication network and a combination thereof.

The transmission apparatus 1305 is configured to receive or send data by using a network, or may further be configured to transmit data between the processor and the memory. A specific example of the foregoing network may include a wired network and a wireless network. In an example, the transmission apparatus 1305 includes a network interface controller (NIC). The NIC may be connected to another network device and a router by using a network cable, so as to communicate with the Internet or a local area network. In an example, the transmission apparatus 1305 is a radio frequency (RF) module, which communicates with the Internet in a wireless manner.

Specifically, the memory 1303 is configured to store an application.

The processor 1301 may invoke, by using the transmission apparatus 1305, the application stored in the memory 1303, to perform the following steps: obtaining a selection instruction generated by an application running on a first terminal in response to a selection operation triggered by a user, the selection instruction including configuration information selected by the user, the configuration information being used for configuring a scene element in the virtual scene; generating indication information according to the selection instruction, the indication information being used for indicating a target scene element in a plurality of scene elements; and transmitting the indication information to an application running on a second terminal, to instruct the application running on the second terminal to display the target scene element in the virtual scene.

The processor 1301 is further configured to perform the following step: transmitting the plurality of pieces of configuration information used for representing a plurality of scene elements to the first terminal, quantities of props configured by using any two of the plurality of pieces of configuration information in the virtual scene being different; transmitting the plurality of pieces of configuration information used for representing a plurality of scene elements to the first terminal, moving trajectories of transport vehicle configured by using any two of the plurality of pieces of configuration information in the virtual scene being different, the transport vehicle being configured to transport a plurality of objects; transmitting the plurality of pieces of configuration information used for representing a plurality of scene elements to the first terminal, safe zones configured by using any two of the plurality of pieces of configuration information in the virtual scene being different, the safe zone being a zone in which no harm is caused to life attributes of a plurality of objects; or transmitting the plurality of pieces of configuration information used for representing a plurality of scene elements to the first terminal, weather environments configured by using any two of the plurality of pieces of configuration information in the virtual scene being different.

For the terminal configured to implement the foregoing configuration method for a virtual scene according to an embodiment of this disclosure, refer to FIG. 13. A display is further included based on the structure shown in FIG. 13.

The display is configured to display a plurality of pieces of configuration information obtained from a server, the configuration information being used for configuring a scene element in a virtual scene.

The processor may invoke, by using the transmission apparatus 1305, the application stored in the memory 1303, to perform the following steps: detecting a selection operation for the plurality of pieces of configuration information, and generating a selection instruction in response to the selection operation, the selection instruction including configuration information that is selected by a user and that is used for determining a target scene element; and transmitting the selection instruction to the server, and determining, through the server based on the selection instruction, the target scene element and generating indication information, to instruct an application running on a second terminal to display the target scene element in the virtual scene.

Optionally, for a specific example in this embodiment, refer to the examples described in the foregoing embodiment. Details are not described herein again in this embodiment.

A person of ordinary skill in the art may understand that, the structure shown in FIG. 13 is only exemplary. The terminal may be a terminal device such as a smartphone (such as an Android mobile phone or an iOS mobile phone), a tablet computer, a palmtop computer, a mobile Internet device (MID), or a PAD. FIG. 13 does not constitute a limitation on the structure of the electronic device. For example, the terminal may further include more or fewer components (for example, a network interface and a display apparatus) than those shown in FIG. 13, or have a configuration different from that shown in FIG. 13.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of this disclosure further provides a storage medium. Optionally, in this embodiment, the storage medium may be configured to store program code for performing configuration method for a virtual scene.

Optionally, in this embodiment, the storage medium may be located on at least one of a plurality of network devices in the network described in the foregoing embodiment.

Optionally, for a specific example in this embodiment, refer to the examples described in the foregoing embodiment. Details are not described herein again in this embodiment.

Optionally, in this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of this disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of this disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of this disclosure.

In the foregoing embodiments of this disclosure, descriptions of the embodiments have different emphases. As for parts that are not described in detail in one embodiment, reference may be made to the relevant descriptions of the other embodiments.

In the several embodiments provided in this disclosure, it is to be understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection through some interfaces, units, or modules, and may be in electrical or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this disclosure may be integrated into one processing unit, or each of the units may exist alone physically, or two or more units are integrated into one unit. The foregoing integrated unit may be implemented in the form of hardware, or may be implemented in the form of a software function unit.

The foregoing descriptions are merely exemplary implementations of this disclosure. A person of ordinary skill in the art may further make several improvements and refinements without departing from the principle of this disclosure, and the improvements and refinements shall fall within the protection scope of this disclosure.

What is claimed is:

1. A method for configuring a virtual scene comprising:
transmitting a plurality of pieces of first-type configuration information for a candidate scene element in the virtual scene to a first-type first client;
transmitting a plurality of pieces of second-type configuration information for the candidate scene element in the virtual scene to a second-type first client, the first-type configuration information and the second-type configuration information being configured respectively for different attributes of the candidate scene element in the virtual scene;
obtaining a target configuration information for a target scene element in the virtual scene based on instructions by the first-type first client and the second-type first client indicating the different attributes of the candidate scene element; and
instructing a second client to display the target scene element in the virtual scene based on the target configuration information, wherein a player activity in the virtual scene is only viewable via the first-type first client and the second-type first client and the player activity in the virtual scene is interactable via the second client.

2. The method of claim 1, wherein the instructions by the first-type first client and the second-type first client are selection instructions, and obtaining the target configuration information comprises:
counting, according to selection instructions transmitted by a plurality of first clients respectively in response to selection operations of different users via the plurality of first clients, a quantity of times that each of a plurality of candidate scene elements is selected; and
determining the target scene element according to the quantity of times that the each of the plurality of candidate scene elements is selected.

3. The method of claim 2, wherein determining the target scene element according to the quantity of times that the each of the plurality of candidate scene elements is selected comprises:
determining a scene element with most selected times as the target scene element.

4. The method of claim 2, wherein determining the target scene element according to the quantity of times that the each of the plurality of candidate scene elements is selected comprises:
determining a weight of the each of the plurality of candidate scene elements according to the quantity of times;
performing, according to a parameter configured for the each of the plurality of candidate scene elements and the weight of the each of the plurality of candidate scene elements, weighted summation to obtain a reference value; and determining a scene element having a parameter closest to the reference value as the target scene element.

5. The method of claim 2, wherein the virtual scene is a virtual scene in an application running on the second client, the application comprises a game application, an event live streaming application, a medical simulation application, or a military simulation application, and the users comprise viewers watching live-streamed content of the application.

6. The method of claim 5, wherein the method further comprises:

in response to the application being in a preset first running stage, sequentially transmitting a plurality of pieces of configuration information of a global scene element to first clients at a specified time point before the application is to display a scene element via the second client.

7. The method of claim 6, wherein the plurality of pieces of configuration information comprises at least one of a plurality of pieces of configuration information of a virtual prop element, a plurality of pieces of configuration information of a moving trajectory of a virtual transport vehicle, a plurality of pieces of configuration information of a safe zone, or a plurality of pieces of configuration information of a weather environment.

8. The method of claim 5, wherein the method further comprises:

randomly transmitting a plurality of pieces of configuration information of a random scene element to first clients according to a scene correlation between a historical scene element in the application and the random scene element.

9. The method of claim 1, wherein the method further comprises:

classifying first clients into the first-type first client and the second-type first client.

10. The method of claim 1, wherein the method further comprises:

transmitting feedback information to first clients, the feedback information indicating whether the candidate scene element is the target scene element.

11. An apparatus for configuring a virtual scene, comprising:

a memory operable to store program code; and a processor operable to read the program code and configured to:

transmit a plurality of pieces of first-type configuration information for a candidate scene element in the virtual scene to a first-type first client;

transmit a plurality of pieces of second-type configuration information for the candidate scene element in the virtual scene to a second-type first client, the first-type configuration information and the second-type configuration information being configured respectively for different attributes of the candidate scene element in the virtual scene;

obtain a target configuration information for a target scene element in the virtual scene based on instructions by the first-type first client and the second-type first client indicating the different attributes of the candidate scene element; and instruct a second client to display the target scene element in the virtual scene based on the target configuration information, wherein a player activity in the virtual scene is only viewable via the first-type first client and the second-type first client and the player activity in the virtual scene is interactable via the second client.

12. The apparatus of claim 11, wherein the instructions by the first-type first client and the second-type first client are selection instructions, and the processor is configured to:

count, according to selection instructions transmitted by a plurality of first clients respectively in response to selection operations of different users via the plurality of first clients, a quantity of times that each of a plurality of candidate scene elements is selected; and determine the target scene element according to the quantity of times that the each of the plurality of candidate scene elements is selected.

13. The apparatus of claim 12, wherein the processor is configured to:

determine a scene element with most selected times as the target scene element.

14. The apparatus of claim 12, wherein the processor is configured to:

determine a weight of the each of the plurality of candidate scene elements according to the quantity of times;

perform, according to a parameter configured for the each of the plurality of candidate scene elements and the weight of the each of the plurality of candidate scene elements, weighted summation to obtain a reference value; and determine a scene element having a parameter closest to the reference value as the target scene element.

15. The apparatus of claim 11, wherein the processor is further configured to:

sequentially transmit a plurality of pieces of configuration information of a global scene element to first clients at a specified time point before the second client is to display a scene element.

16. The apparatus of claim 15, wherein the plurality of pieces of configuration information comprises at least one of a plurality of pieces of configuration information of a virtual prop element, a plurality of pieces of configuration information of a moving trajectory of a virtual transport vehicle, a plurality of pieces of configuration information of a safe zone, or a plurality of pieces of configuration information of a weather environment.

17. The apparatus of claim 11, wherein the processor is further configured to:

randomly transmit a plurality of pieces of configuration information of a random scene element to first clients according to a scene correlation between a historical scene element in the virtual scene and the random scene element.

18. The apparatus of claim 11, wherein the processor is further configured to:

classify first clients into the first-type first client and the second-type first client.

19. The apparatus of claim 11, wherein the processor is further configured to:

transmit feedback information to the first client, the feedback information indicating whether the candidate scene element is the target scene element.

20. A non-transitory machine-readable storage medium, having processor executable instructions stored thereon for causing a processor to:

transmit a plurality of pieces of first-type configuration information for a candidate scene element in the virtual scene to a first-type first client;

transmit a plurality of pieces of second-type configuration information for the candidate scene element in the virtual scene to a second-type first client, the first-type configuration information and the second-type configuration information being configured respectively for different attributes of the candidate scene element in the virtual scene;

obtain a target configuration information for a target scene element in the virtual scene based on instructions by the first-type first client and the second-type first client indicating the different attributes of the candidate scene element; and instruct a second client to display the target scene element in the virtual scene based on the target configuration information, wherein a player activity in the virtual scene is only viewable via the first-type first client and the second-type first client and the player activity in the virtual scene is interactable via the second client.

* * * * *